United States Patent
Keller

(10) Patent No.: US 6,778,549 B1
(45) Date of Patent: Aug. 17, 2004

(54) COUPLING DEVICE CONNECTING MULTIPLE POTS LINES IN AN HPNA ENVIRONMENT

(75) Inventor: Philip J Keller, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 769 days.

(21) Appl. No.: 09/667,382

(22) Filed: Sep. 22, 2000

(51) Int. Cl.[7] .............................................. H04Q 11/02
(52) U.S. Cl. .................. 370/430; 370/352; 379/399.01
(58) Field of Search ................................. 370/401–403, 370/445, 488, 489, 502, 210, 494, 465, 430, 392, 352; 710/300, 306, 307; 379/93.07, 399.01, 413.02, 399, 93.05, 90.01, 220.01, 27.01, 142; 385/17; 330/282, 252; 375/258, 222, 326, 220, 261, 355

(56) References Cited

U.S. PATENT DOCUMENTS

| | | | | |
|---|---|---|---|---|
| 5,483,589 A | * | 1/1996 | Ishida et al. | 379/22.01 |
| 5,809,111 A | * | 9/1998 | Matthews | 379/31 |
| 6,088,368 A | * | 7/2000 | Rubinstain et al. | 370/480 |
| 6,181,783 B1 | * | 1/2001 | Goodman | 379/93.05 |
| 6,219,411 B1 | * | 4/2001 | Peters et al. | 379/177 |
| 6,285,754 B1 | * | 9/2001 | Sun et al. | 379/399.02 |
| 6,314,102 B1 | * | 11/2001 | Czerwiec et al. | 370/395.6 |
| 6,456,633 B1 | * | 9/2002 | Chen | 370/490 |
| 6,690,677 B1 | * | 2/2004 | Binder | 370/465 |
| 2002/0110118 A1 | * | 8/2002 | Foley | 370/352 |
| 2003/0101459 A1 | * | 5/2003 | Edson | 725/82 |

* cited by examiner

*Primary Examiner*—John Pezzlo
(74) *Attorney, Agent, or Firm*—Renner, Otto, Boisselle & Sklar, LLP

(57) ABSTRACT

A local area data network includes two separate and unique twisted pair telephone networks joined by a coupler to form a common data network. The coupler operates to pass pulse position modulated data signals (PPM) and quadrature amplitude modulate (QAM) data signals between the telephone networks and isolate each plain old telephone service (POTS) signals on one telephone network from the other telephone network.

27 Claims, 3 Drawing Sheets

COUPLING DEVICE CONNECTING MULTIPLE POTS LINES IN AN HPNA ENVIRONMENT

TECHNICAL FIELD

The present invention relates generally to network interfacing and, more particularly, to an apparatus and method for connecting multiple networks, each of which is implemented on unique telephone line, to form a common network.

BACKGROUND OF THE INVENTION

Networking plays a critical role in the sharing of information from between two remotely located computing devices. Government bodies and business entities heavily utilize local and wide area networks to communicate and share information. A typical government or commercial facility includes an Ethernet network with a physical topology utilizing Category V cabling. Category V cabling is a shielded cabling specifically designed to reduce distortion of high frequency data signals. Further, a typical government or commercial facility includes a separate and distinct PBX network for telephone calls. For many reasons, the Ethernet data network and the PBX network are separate networks. These reasons include network physical topology, conflicts between Ethernet and PBX environments, and other fundamental incompatibilities between Ethernet protocols and PBX protocols. Until the recent development of Voice over IP standards which enable packet voice communications over a data network, little thought was given to combining such systems into a single network.

In a home environment, a PBX system is not normally used and a plain old telephone service (POTS) network of twisted pair wires typically connects a plurality of RJ-11 jacks throughout the home to a POTS line coupled to a local telephone switch. The POTS line can support a single connection (e.g. telephone conversation or modem dial-up connection) at any one time. Therefore, while the POTS network in the home may be a single-bus-multiple-drop physical topology with a plurality of device connected thereto, only one connection at time may be made through the local telephone switch.

Recently, there has been an increased demand for networking of multiple computing devices within a home environment. Many households have multiple PC computers, printers, and other shared peripherals. Further, there is a growing demand for other home electronics and appliances to have networking capabilities such that they can be monitored and controlled from remote locations. An obvious desire is to utilize the POTS network within the home for data networking. Homes already have an infrastructure of telephone wires built into their walls; there is no need to re-wire homes with more expensive conventional networking wiring. Further, the high speed data capabilities of conventional data networks typically are not needed because the sharing of data between home PC's and other home electronics such as smoke detectors, burglar alarms, ovens, light fixtures, sprinkler systems, and the like does not require fast data rates or high data volumes. The less expensive, and existing, twisted pair telephone lines will suffice as a medium to transmit data between these types of network devices.

The Home Phone Line Networking Association (HPNA) is a consortium of companies, including Advanced Micro Devices of Sunnyvale Calif., which has developed communications protocols and networking standards for transmitting data between two devices across the POTS system of a home. The HPNA system enables multiple devices, each connected to the telephone line in a multi-drop architecture, to communicate with each other. In the HPNA 1.0 environment a pulse position modulation (PPM) system is utilized and in the HPNA 2.0 environment, a 7 MHz quadrature amplitude modulated (QAM) modulated carrier is utilized as well as the PPM system. Further, a telephone can communicate with a local telephone switch utilizing POTS 0.3–3.4 KHz signals at the same time various computing devices are communicating with each other utilizing the HPNA 1.0 or 2.0 schemes. The HPNA 1.0 and 2.0 systems enable many devices to communicate frames of data with each other using a carrier sense multiple access (CSMA) protocol.

The problem with implementing an HPNA data network environment in a home environment is that many homes are wired with two or more separate phone lines, each with its own distinct POTS network throughout the home. Each POTS network is independent and separate of other networks to enable each to have a distinct telephone number and telephone service independent of the other lines. As such, HPNA data can not cross from one POTS network to another. If the POTS networks were coupled together, the voice signal of one telephone line would cross over and interfere with the voice signal of another telephone line.

Therefore, based on recognized industry goals for efficient and effective networking in a multiple POTS environment, a device and a method is needed to couple multiple POTS networks to form a common data network to transmit and receive data among network devices while preventing interference between telephone signals unique to each POTS line.

SUMMARY OF THE INVENTION

A first object of the present invention is to provide a local area network comprising at least two separate and unique telephone lines and a coupling device for connecting multiple separate and unique telephone lines. The local area network may comprise a network medium of twisted pair telephone wires, which is used to connect a plurality of network devices via RJ-11 jacks. The network devices may include computers, smoke detectors, burglar alarms, ovens, light fixtures, sprinkler systems, and the like.

The local area network may further include a telephone for making telephone calls independent of transmissions and receptions among the network devices. A telephone and a number of network devices connected to the network medium of twisted pair telephone wires form one separate and unique "line one". Another telephone and another number of network devices connected to the network medium of twisted pair telephone wires form a second separate and unique "line two". The telephone calls operate utilizing plain old telephone service signals in a frequency range of 0.3–3.4 KHz. The network devices transmit and receive data signals which include frames of data modulated onto an analog carrier. The modulation technique may include quadrature amplitude modulation and pulse position modulation.

The coupling device may comprise a first transformer coupled to a first of the telephone lines and second transformer coupled to a second of the telephone lines and a high pass or a band pass filter coupled between the first and second transformer.

A second object of the present invention is to provide a method of coupling data between two telephone networks. The method comprises the steps of: a) generating telephone signals on a first telephone network; b) generating data signals on at least one of the first and a second telephone network; c) passing data signals between the first telephone network and the second telephone network; and d) isolating telephone signals on the first telephone network from the second telephone network.

The step of generating telephone signals may include generating plain old telephone service signals in a frequency range of 0.3–3.4 KHz and the step of generating data signals may include generating frames of data modulated onto an analog carrier. The modulation technique may include quadrature amplitude modulation and pulse position modulation.

The step of passing data signals may include utilizing a first transformer coupled to the first telephone network and second transformer coupled to the second telephone network and a high pass filter or a band pass filter coupled between the first and second transformer.

A third object of the present invention is to provide a coupling device for providing selective coupling between at least two individual telephone networks. The coupling device comprises: a) a first set of terminals for connecting the coupling device to a first one of the at least two individual telephone networks; b) a second set of terminals for connecting the coupling device to a second one of the at least two individual telephone networks; and c) a filter operatively coupled to the first and second set of terminals and tuned to pass there between a predefined band of signal frequencies associated with network data communications and to block there between a predefined band of signal frequencies associated with audio communications.

The signal frequencies associated with audio communications may include plain old telephone service signals in a frequency range of 0.3–3.4 KHz and the signal frequencies associated with network data communications may include modulated carrier signals with a carrier frequency greater than 1 MHz.

The filter may include a first transformer coupled to the first set of terminals and a second transformer coupled to a second of terminals and a high pass filter or a band pass filter coupled between the first and second transformer.

DESCRIPTION OF THE PREFERRED EMBODIMENTS

Figure 1:
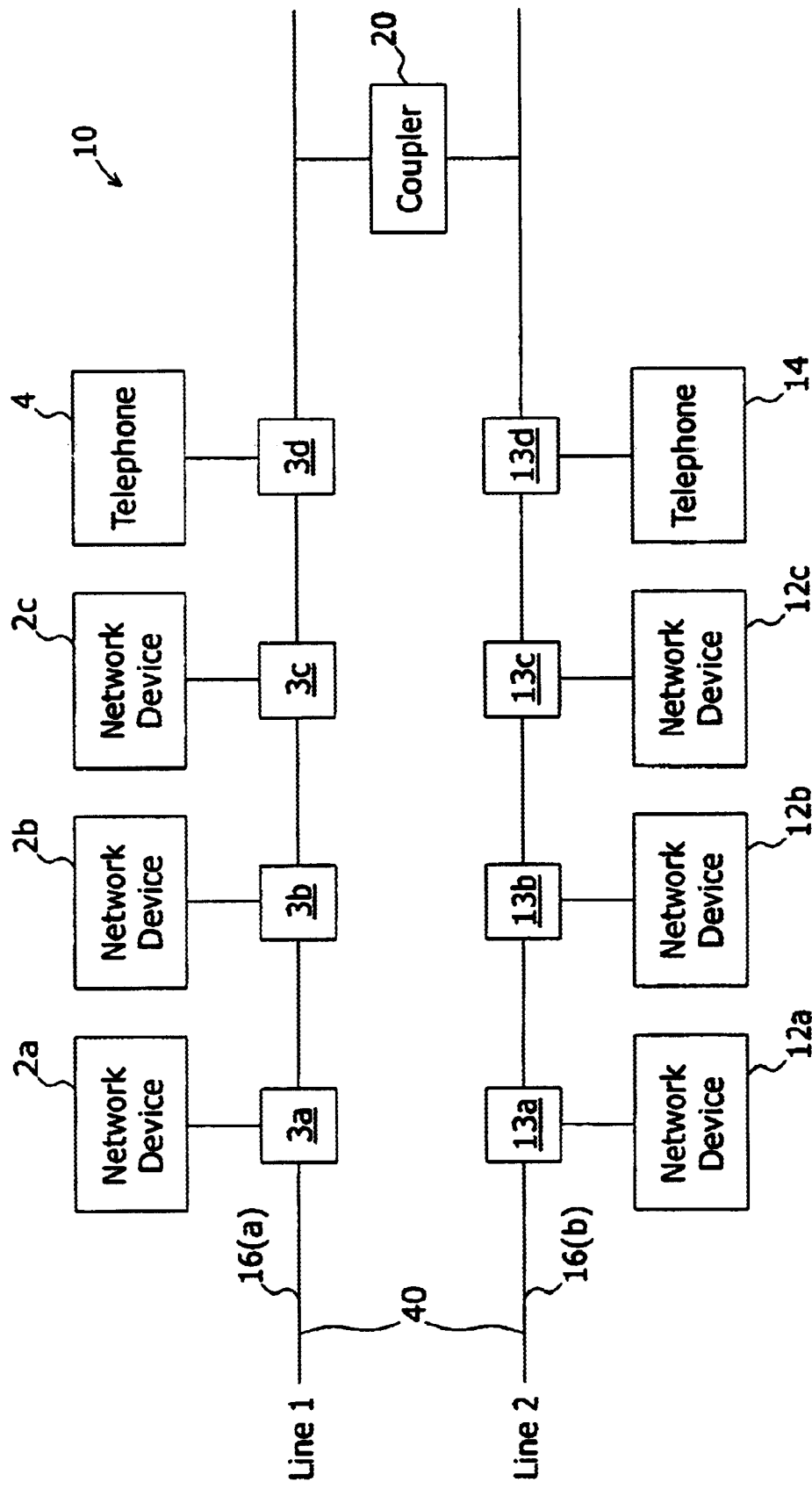
FIG. 1 is a block diagram of a local area network in accordance with one embodiment of this invention.

The present invention will now be described in detail with reference to the drawings. In the drawings, like reference numerals are used to refer to like elements throughout.

FIG. 1 is a diagram of a local area network 10 implemented in a home environment using a network twisted pair physical medium 40. The local area network 10 include two separate plain old telephone service (POTS) networks 16(a) and 16(b). The first POTS network 16(a) is coupled to Line 1 which represents a first telephone line connection to a local telephone switch. Similarly, the second POTS network 16(b) is coupled to Line 2 which represents a second telephone line connection to the local telephone switch. A first telephone 4 is coupled to an RJ-11 jack 3(d) on the first POTS network 16(a) for utilizing Line 1 for placing and receiving telephone calls via the local telephone switch. Similarly, a second telephone 14 is coupled to an RJ-11 jack 13(d) for utilizing Line 2 for placing and receiving telephone calls via the local telephone switch. The placing and receiving of telephone calls utilizes POTS signals which are 0.3 to 3.4 Khz circuit switched analog signals.

A plurality of network computing devices 2(a)–2(c) are coupled, via RJ-11 jacks 3(a)–3(c) respectively, to the first POTS network 16(a) for communicating frames of data via the network medium 40. Similarly, network computing devices 12(a)–12(c) are coupled, via RJ-11 jacks 13(a)–13(c) respectively, to the second POTS network 16(b) for communicating frames of data via the network medium 40.

In the preferred embodiment, each of the network computing devices 2(a)–2(c) on the first POTS network 16(a) and each of the network computing devices 12(a) 12(c) on the second PTS network 16(b) may comprise a personal computer, printer, server, or other network compliant consumer devices such as a smoke detector, appliance, door opener, or other small electronic devices of the like. Each of the network devices 2a–2c and 12a–12c communicate by transmitting frames of data modulated utilizing either the HPNA 1.0 or HPNA 2.0 standards. The HPNA 1.0 standard utilizes a pulse position modulation (PPM) transmission protocol which is promulgated by the Home Phone Line Network Association which is a consortium of network equipment providers including Advanced Micro Devices, Inc. of Sunnyvale, Calif. The HPNA 2.0 standard is promulgated by the same consortium and utilizes a 7 MHz carrier with a quadrature amplitude modulation (QAM) transmission protocol along with the PPM protocol of the 1.0 standard for backwards compatibility. The PPM protocol provides for a 1-Mbit data rate while the QAM protocol provides for a 10-Mbit data rate.

A coupler 20 is connected to both the first POTS network 16(a) and the second POTS network 16(b) and operates to couple data signals transmitted by one of the network devices 2(a)–2(c) from the first POTS network 16(a) to the second POTS network 16(b) and to couple data signals transmitted by one of the network devices 12(a)–12(c) from the second POTS network 16(b) to the first POTS network 16(a). However, the coupler 20 does not couple POTS signals from Line 1 and/or telephone 4 on the first POTS network 16(a) to the second POTS network 16(b) or POTS signals from Line 2 or telephone 14 on the second POTS network 16(b) to the first POTS network 16(a).

As such, it should be appreciated that telephone 4 and telephone 14 may each be utilized to send and receive telephone calls simultaneously without interference with each other through coupler 20. And, at the same time, network devices 2(a) to 2(c) on the first POTS network 16(a) can communicate with network devices 12(a)–12(c) on the second POTS network 16(b) through coupler 20.

Figure 2:
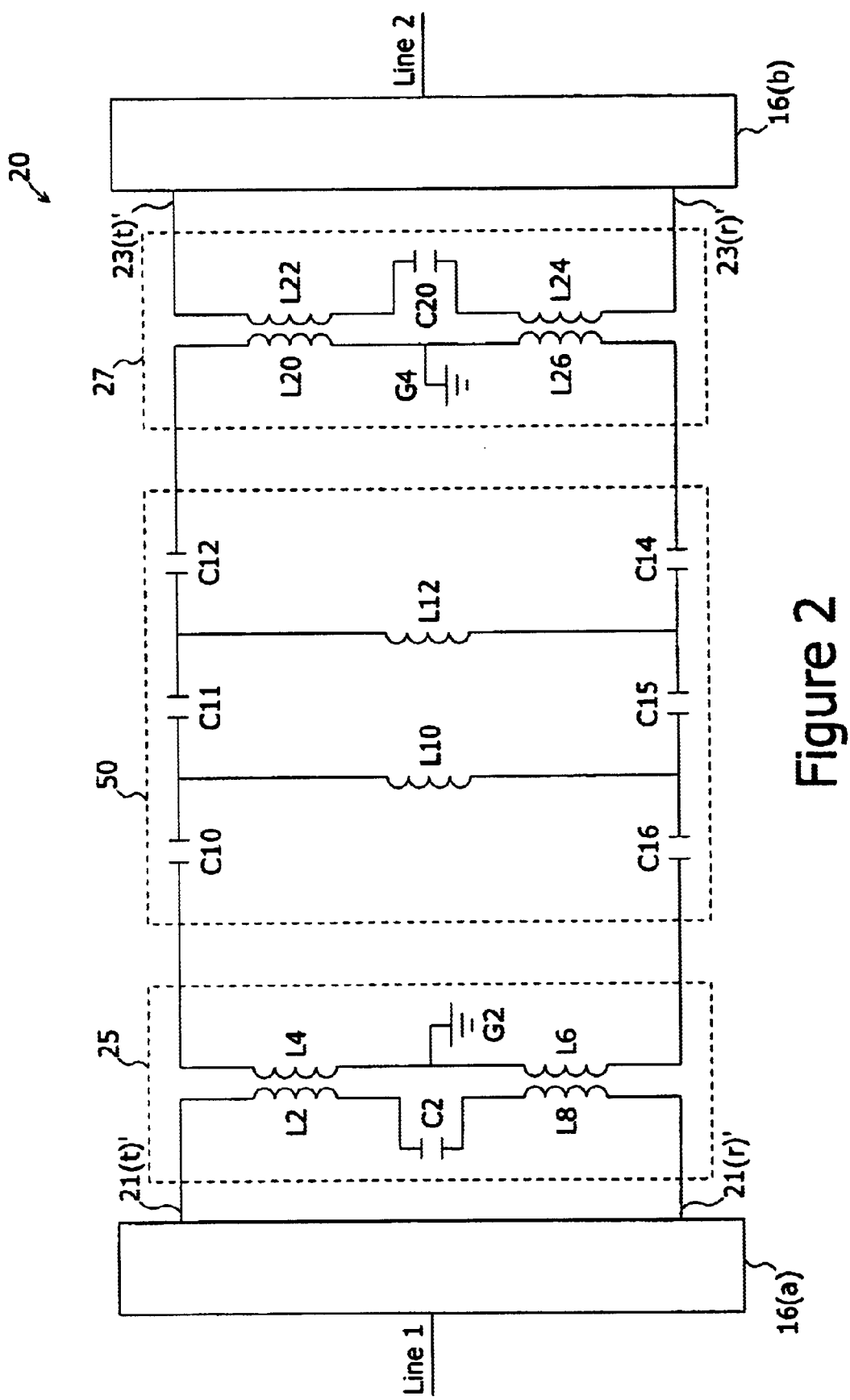
FIG. 2 is a block diagram of a POTS coupler utilized in the local area network of FIG. 1 in accordance with one embodiment of this invention.

Referring to FIG. 2, a circuit diagram of a preferred embodiment of the coupler 20 is shown. The coupler 20 includes lines 21(t) and 21(r) which couple to a tip line and a ring line, respectively, of the first POTS network 16(a). Similarly, the coupler includes lines 23(t) and 23(r) which couple to a tip line and a ring line, respectively, of the second POTS network 16(b).

A first transformer circuit 25 is formed by four inductors L2, L4, L6, L8, a capacitor C2, and a ground coupling G2 and operates to provide DC isolation between a high pass filter circuit 50 and the first POTS network 16(a). Similarly, a second transformer circuit 27 is formed by four inductors L20, L22, L24, L26, a capacitor C20, and a coupling to ground G4 and operates to provide DC isolation between a high pass filter circuit 50 and the second POTS network 16(b).

In the preferred embodiment, the high pass filter circuit 50 is a second order high pass filter having a −3 dB point sufficient to block the voice frequencies and pass unattenuated the HPNA frequencies. As such, the high pass filter circuit 50 operates to pass signals with a frequency on the order of 5 MHz or greater while blocking lower frequency signals. Thus, the low frequency POTS signals (e.g. voice signals) within the 0.3–3.4 KHz range on the first POTS network 16(a) are blocked by the high pass filter from crossing over to the second POTS network 16(b), and vice versa. However, the higher frequency data signals (on the order of 7 MHz) on the first POTS network 16(a) are allowed to pass through the high pass filter circuit 50 to the second POTS network 16(b), and vice versa. It should be appreciated that the higher frequency data signals include the HPNA 2.0 QAM modulated carrier signal and the HPNA 1.0 PPM modulated carrier signal. Since the PPM modulated signals for HPNA 1.0 are 7.5 MHz pulses, they will be unattenuated by the high pass filter.

In the preferred embodiment, the high pass filter circuit 50 further comprises two inductors L10 and L12 along with six capacitors C10, C11, C12, C14, C15, and C16. Exemplary values for each such component are: 1.8 uh for each of inductors L10 and L12; 560 pf for each of capacitors C10, C12, C14, and C16; and 470 pf for each of capacitors C11 and C15. These values will produce a filter with a −3 db point of approximately 4.5 MHz.

Figure 3:
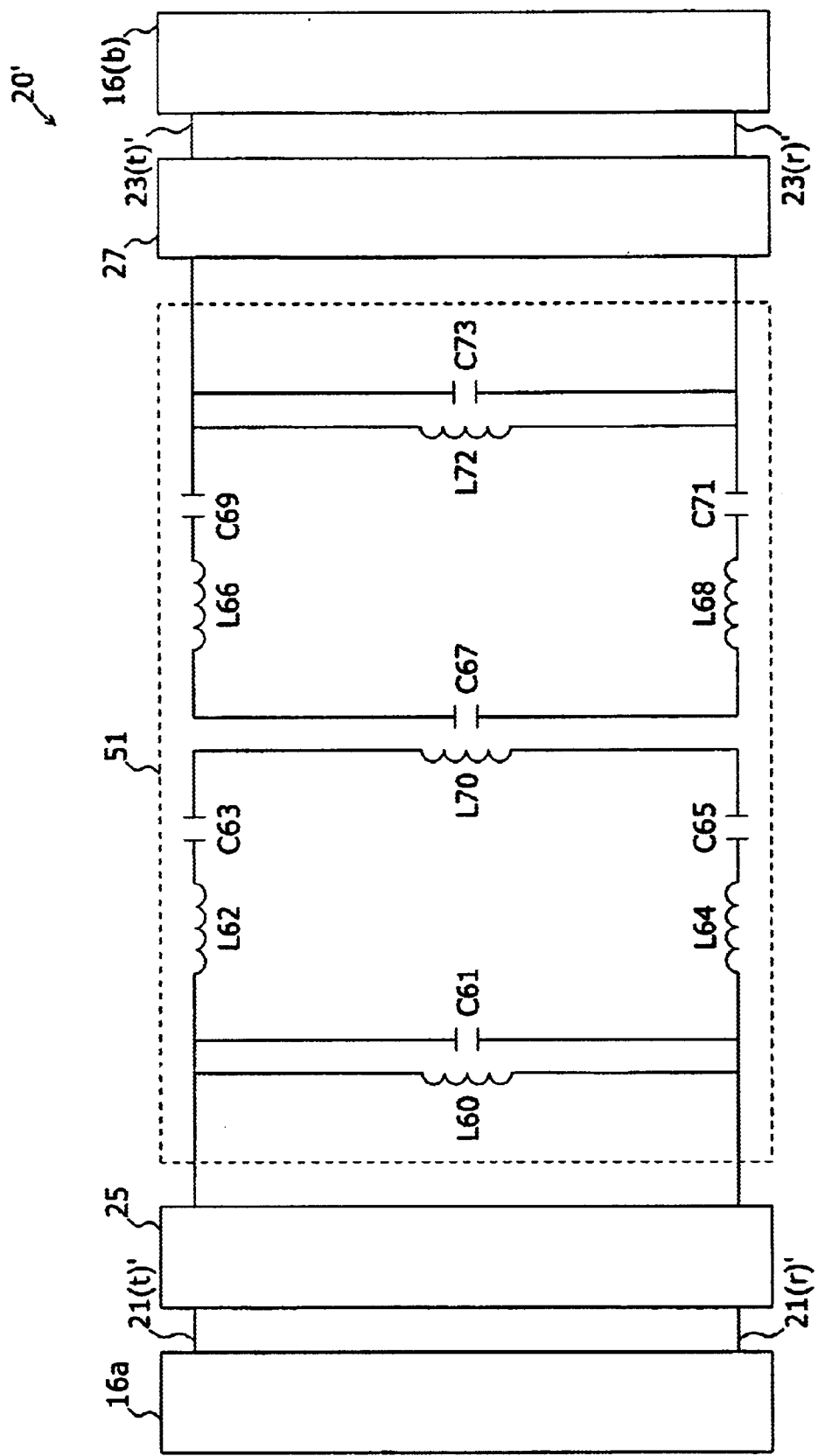
FIG. 3 is a block diagram of a POTS coupler utilized in the local area network of FIG. 1 in accordance with an alternative embodiment of this invention.

FIG. 3 shows an alternative embodiment of a coupler 20' which includes a band pass filter. The coupler 20' includes lines 21(t)' and 21(r)' which couple to a tip line and a ring line, respectively, of the first POTS network 16(a). Similarly, the coupler includes lines 23(t)' and 23(r)' which couple to a tip line and a ring line, respectively, of the second POTS network 16(b).

A first transformer circuit 25, which includes the same structure as described with respect to FIG. 2, provides the required DC isolation between a band pass filter circuit 51 and the first POTS network 16(a). Similarly, a second transformer circuit 27, again with the same structure as described with respect to FIG. 2, provides the required DC isolation between the band pass filter circuit 51 and the second POTS network 16(b).

In the preferred embodiment, the band pass filter circuit 51 operates to pass signals with a frequency within the band of frequencies bounded by approximately 4 MHz on the low end and approximately 14 MHz on the upper end while blocking signals outside of the band. As such, the low frequency POTS signals (e.g. voice signals) within the 0.3–3.4 kHz range on the first POTS network 16(a) are below the pass band and are blocked by the band pass filter from crossing over to the second POTS network 16(b), and vice versa. However, the higher frequency HPNA data signals (on the order of 7 MHz) on the first POTS network 16(a) are allowed to pass through the band pass filter circuit 51 to the second POTS network 16(b), and vice versa.

In the preferred embodiment, the band pass filter circuit 51 comprises seven inductors L60, L62, L64, L66, L68, L70, and L72 along with seven capacitors C61, C63, C65, C67, C69, C71, and C73. Exemplary values for each such component are: 8.2 uh for each of inductors L62, L64, L66, L68, and L70; 5.6 uh for each of inductors L60 and L72; 560 pf for each of capacitors C63, C65, C69, and C71; 470 pf for each of capacitors C61 and C73; and 50 pf for capacitor C67.

It should be appreciated that the exemplary embodiments of a coupler described above are simple, low cost, passive couplers. The components are passive components which are generally available. However, it is contemplated that other filters may be used for achieving the functionality described. For example, active filters could readily be used and fall within the scope of this invention as well as other equivalents and modifications which may occur to those skilled in the art upon the reading and understanding of the specification.

While the exemplary embodiment is directed towards HPNA 1.0 PPM and HPNA if 2.0 QAM modulation, the invention is as readily useful in frequency modulation, phase shift keying, and other modulation techniques as well as for base band signaling. The present invention includes all such equivalents and modifications, and is limited only by the scope of the following claims.

What is claimed is:

1. A local area network comprising:
    a) two separate telephone networks, at least one of the networks coupled to a telephone line;
    b) a telephone coupled to the network coupled to the telephone line and generating telephone signals;
    c) a plurality of network computing devices, each of which is coupled to one of the telephone networks and each of which generates data signals; and
    d) a coupling device coupled to each of the telephone networks and operating to pass data signals from one telephone network to the other telephone network and isolate telephone signals on one telephone network from the other telephone network.

2. The local area network of claim 1, wherein the telephone signals include plain old telephone service (POTS) signals in a frequency range of 0.3–3.4 KHz.

3. The local area network of claim 2, wherein the data signals include frames of data modulated onto an analog carrier.

4. The local area network of claim 3, wherein the coupling device includes a first transformer coupled to a first of the telephone networks and second transformer coupled to a second of the telephone networks and a high pass filter coupled between the first and second transformer.

5. The local area network of claim 4, wherein the data signals are modulated onto the carrier utilizing quadrature amplitude modulation.

6. The local area network of claim 5, wherein the plurality of network devices includes devices selected from the group of computers, smoke detectors, burglar alarms, ovens, light fixtures, and sprinkler systems.

7. The local area network of claim 4, wherein the data signals include frames of data modulated utilizing the position of discrete pulses.

8. The local area network of claim 7, wherein the plurality of network devices includes devices selected from the group of computers, smoke detectors, burglar alarms, ovens, light fixtures, and sprinkler systems.

9. The local area network of claim 3, wherein the coupling device includes a band pass filter coupled between a first of the telephone networks and a second of the telephone networks.

10. The local area network of claim 9, wherein the data signals are modulated onto the carrier utilizing quadrature amplitude modulation.

11. The local area network of claim 10, wherein the plurality of network devices includes devices selected from the group of computers, smoke detectors, burglar alarms, ovens, light fixtures, and sprinkler systems.

12. The local area network of claim 9, wherein the data signals include frames of data modulated utilizing the position of discrete pulses.

13. The local area network of claim 12, wherein the plurality of network devices includes devices selected from the group of computers, smoke detectors, burglar alarms, ovens, light fixtures, and sprinkler systems.

14. A method of coupling data between two telephone networks, the method comprising:
   a) generating telephone signals on a first telephone network;
   b) generating data signals on at least one of the first and a second telephone network;
   c) passing data signals between the first telephone network and the second telephone network; and
   d) isolating telephone signals on the first telephone network from the second telephone network.

15. The method of coupling data between two telephone networks of claim 14, wherein the step of generating telephone signals includes generating plain old telephone service signals in a frequency range of 0.3–3.4 KHz.

16. The method of coupling data between two telephone networks of claim 15, wherein step of generating data signals includes generating frames of data modulated onto an analog carrier.

17. The method of coupling data between two telephone networks of claim 16, wherein the step of generating data signals includes utilizing quadrature amplitude modulation techniques to modulate the carrier.

18. The method of coupling data between two telephone networks of claim 17, wherein the step of passing data signals includes utilizing a first transformer coupled to the first telephone network and second transformer coupled to the second telephone network and a high pass filter coupled between the first and second transformer.

19. The method of coupling data between two telephone networks of claim 17, wherein the step of passing data signals includes utilizing a band pass filter coupled between the first telephone network and the second telephone network.

20. The method of coupling data between two telephone networks of claim 16, wherein the step of generating data signals includes utilizing pulse position modulation techniques to modulate data utilizing the position of discrete pulses.

21. The method of coupling data between two telephone networks of claim 20, wherein the step of passing data signals includes utilizing a first transformer coupled to the first telephone network and second transformer coupled to the second telephone network and a high pass filter coupled between the first and second transformer.

22. The method of coupling data between two telephone networks of claim 20, wherein the step of passing data signals includes utilizing a band pass filter coupled between the first telephone network and the second telephone network.

23. A coupling device for providing selective coupling between at least two individual telephone networks, the coupling device comprising:
   a) a first set of terminals for connecting the coupling device to a first one of the at least two individual telephone networks;
   b) a second set of terminals for connecting the coupling device to a second one of the at least two individual telephone networks; and
   c) a filter operatively coupled to the first and second set of terminals and tuned to pass there between a predefined band of signal frequencies associated with network data communications and to block there between a predefined band of signal frequencies associated with audio communications.

24. The coupling device of claim 23, wherein the signal frequencies associated with audio communications include plain old telephone service signals in a frequency range of 0.3–3.4 KHz.

25. The coupling device of claim 24, wherein the signal frequencies associated with network data communications include modulated carrier signals with a carrier frequency greater than 1 MHz.

26. The coupling device of claim 25, wherein the filter includes a first transformer coupled to the first set of terminals and a second transformer coupled to a second of terminals and a high pass filter coupled between the first and second transformer.

27. The coupling device of claim 25, wherein the filter includes a first transformer coupled to the first set of terminals and a second transformer coupled to a second of terminals and a band pass filter coupled between the first and second transformer.

* * * * *